United States Patent [19]

Kanamaru

[11] Patent Number: 4,479,683
[45] Date of Patent: Oct. 30, 1984

[54] CROSS ROLLER BEARING
[75] Inventor: Takayoshi Kanamaru, Tokyo, Japan
[73] Assignee: Toho Seiko Co., Ltd., Tokyo, Japan
[21] Appl. No.: 472,572
[22] Filed: Mar. 7, 1983
[30] Foreign Application Priority Data Mar. 11, 1982 [JP] Japan .................................. 57-33240

[51] Int. Cl.³ ............................................. F16C 19/30
[52] U.S. Cl. .................................... 384/619; 384/621
[58] Field of Search ............... 308/227, 235, 231, 234, 308/229, 232, 219

[56] References Cited
U.S. PATENT DOCUMENTS 2,734,786 2/1956 McNicoll ............................ 308/235
3,275,391 9/1966 Blais .................................... 308/235
3,517,975 6/1970 Lonngren et al. ................... 308/227

Primary Examiner—Lenard A. Footland
Attorney, Agent, or Firm—George B. Oujevolk

[57] ABSTRACT

The present invention discloses a spacer retainer in a cross roller bearing. More specifically, in a cross roller bearing comprising an inner race having a V-shaped groove with an angle of approximately 90 degrees formed in the outer periphery thereof, a bisplit outer race having a V-shaped groove with an angle of approximately 90 degrees formed in the inner periphery thereof, and rollers disposed in those V-shaped grooves in an alternately crossing manner through spacer retainers, the spacer retainers are each provided at both side ends thereof with curved surfaces perpendicularly intersecting each other, the curved surfaces being each formed as a curved concave surface having a radius of curvature somewhat larger than that of the roller, with a larger side thickness of a starting edge circle of the curved concave surface being smaller than a smaller side thickness of a terminating edge circle of the curved concave surface, and the spacer retainer is further provided with an axially extending oil reservoiring through hole formed therein.

2 Claims, 8 Drawing Figures

CROSS ROLLER BEARING

BACKGROUND OF THE INVENTION

The present invention relates to a cross roller bearing in which a V-shaped groove with an angle of approximately 90 degrees is formed in both the outer periphery of an inner race and the inner periphery of a bisplit outer race and rollers are disposed in the V-shaped grooves circumferentially in an alternately crossing manner through spacer retainers each formed with an oil reservoring through hole.

More particularly, the present invention is concerned with a cross roller bearing having a thin, compact and highly rigid construction as a whole in which rollers arranged circumferentially in an exact alternately perpendicularly intersecting relation through spacer retainers which perform a rolling motion within 90-degrees. V-shaped grooves formed in the outer periphery of an inner race and the inner periphery of a bisplit outer race, and which, as a single bearing, can undergo complex loads such as radial, thrust and moment loads simultaneously, thus permitting an optimum application to swivel and joint portions of industrial robots, rotating portions of manipulators, etc.

OBJECTS OF THE INVENTION

The objects of the present invention are to enhance the heat dissipation effect against a generated heat from the rollers, to prevent skew between rollers and to eliminate friction between rollers, and to this end, to provide a spacer retainer between rollers which spacer retainer is provided at both side ends thereof with curved concave surfaces perpendicularly intersecting each other and has an axially extending oil reservoiring through hole formed therein.

SUMMARY OF THE INVENTION

Briefly stated, the present invention contemplates a cross roller bearing comprising an inner race having a V-shaped groove with an angle of approximately 90 degrees formed in the outer periphery thereof, a bisplit outer race having a V-shaped groove with an angle of of approximately 90 degrees formed in the inner periphery thereof, and rollers disposed in those V-shaped grooves in an alternately crossing manner through spacer retainers. The spacer retainers are each provided at both side ends thereof with curved surfaces perpendicularly intersecting each other, the curved surfaces being each formed as a curved concave surface having a radius of curvature somewhat larger than that of the roller, with a larger side thickness of a starting edge circle of the curved concave surface being smaller than a smaller side thickness of a terminating edge circle of the curved concave surface, and the spacer retainer is further provided with an axially extending oil reservoring through hole formed therein.

The foregoing arrangement operates as follows.

A spacer retainer formed with curved concave surfaces perpendicularly intersecting each other and having an angle $\theta$ is disposed between rollers to thereby restrict the center line of rotation of the roller; besides, since the roller rotates about the same central point, it is possible to prevent skewing of the roller, and a stable motion can be attained because of a uniformalized differential slip, and further, not only friction between rollers is reduced but also a superior heat dissipation effect and a uniform cooling are attained because an oil reservoir through hole is formed in each spacer retainer. As a result, there is provided a spacer retainer of high accuracy with a minimu likelihood of occurrence of distortion.

Furthermore, since the last spacer retainer to be mounted in assembling the cross roller bearing is adjusted in its dimension so as to reduce a radial gap, the foregoing effect of uniformalizing the differential slip can be attained.

Additionally, since the spacer retainer, as mentioned above, is provided at both sides thereof with curved concave surfaces perpendicularly intersecting each other and having an angle, it is also possible to prevent flaking caused by rolling fatigue between rollers and the track surface.

Other and further objects, features, functions and effects of the present invention will become apparent from the following detailed description taken in connection with the drawings.

DESCRIPTION OF A PREFERRED EMBODIMENT

Figure 1:
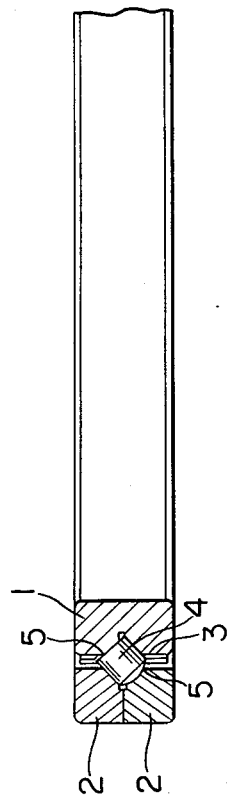
FIG. 1 is a longitudinal sectional view of a conventional cross roller bearing, partly omitted.

To understand the present inventive concept it is first necessary to understand the construction of a conventional cross roller bearing (also called a turntable). As shown in FIG. 1, rollers 4, which are shorter in length than in diameter, are disposed in an alternately crossing manner at predetermined intervals within a retainer 3 inserted between inner and outer races 1 and 2.

The rollers 4 are fitted in pockets formed in the retainer 3 and retained by upper and lower anti-coming off-tongue pieces 5 and a gap is formed so that the rollers can roll smoothly along the circumferential direction; as a result, there occurs a slight, relative, repeated slip between rollers and the pockets of the retainers and thus, it is impossible to prevent skewing of rolling rollers 4.

Consequently, the retainer pockets undergo an abnormal wear and a fretting corrosion occurs on the roller surfaces, thus making it impossible for the bearing to stand long use.

The technical means of the present invention will be described hereinunder with reference to the accompanying drawing.

Figure 2:
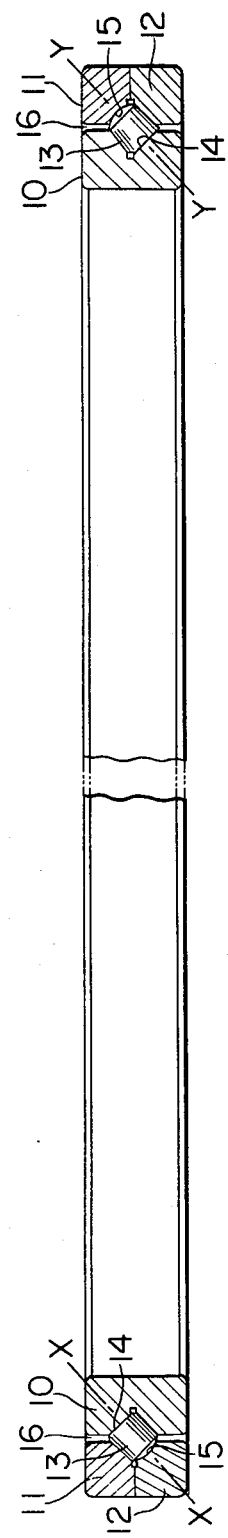
FIG. 2 is a longitudinal sectional view of the cross roller bearing of the present invention.

The reference numeral 10 denotes an inner race, with a V-shaped groove 14 with an angle of 90 degrees being formed in the outer periphery of the inner race 10, and similarly a V-shaped groove 15 with an angle of 90 degrees is formed in the inner peripheries of bisplit outer races 11 and 12 in opposed relation to the V-shaped groove 14 of the inner race 10 (see FIG. 2).

Figure 6:
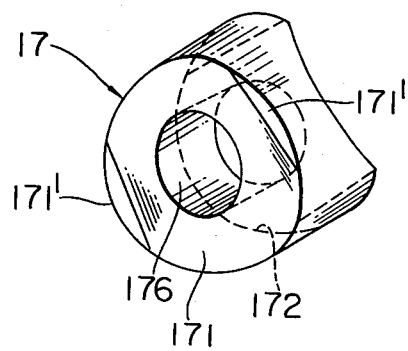
FIG. 6 is a perspective view of the spacer retainer used in the present invention.

Numeral 13 denotes a roller comprising a cylindrical body somewhat shorter in length than in diameter, one end of which is formed as a flat surface 131 and with the other end thereof being formed as a curved convex surface 132. Numeral 17 denotes a spacer retainer, which, as shown in FIG. 6, is provided at both side ends thereof with curved surfaces perpendicularly intersecting each other, the curved surfaces being each formed as a curved concave surface 172 (or 171) having a radius of curvature somewhat larger than that of the roller 13, with a larger side thickness "a" of a starting edge circle 173 of the curved concave surface 172 being smaller than a smaller side thickness "b" of a terminating edge circle 174 thereof.

More particularly, the spacer retainer 17 is formed at both ends thereof with curved concave surfaces 171 and 172 each having an angle $\theta$ whereby there are formed right and left projections $175^1$ and like projections $175^2$.

Numeral 176 denotes an oil reservoir through hole formed axially of the spacer retainer 17, and numeral 16 denotes a gap formed between inner and outer races.

Operation of the cross roller bearing of the invention constructed as above will be described below.

When a predetermined number of rollers 13 are disposed in the V-shaped grooves between the inner and outer races 10 and 12 in an alternately crossing manner through the spacer retainers 17, the curved concave surface 171 having an angle $\theta$ of each spacer retainer 17 holds an outer peripheral surface 133 of the roller 13, and at the same time the opposite side outer peripheral surface 133 of the roller 13 is held by the angular, curved concave surface 172 of the adjacent spacer retainer 17.

Figure 3:
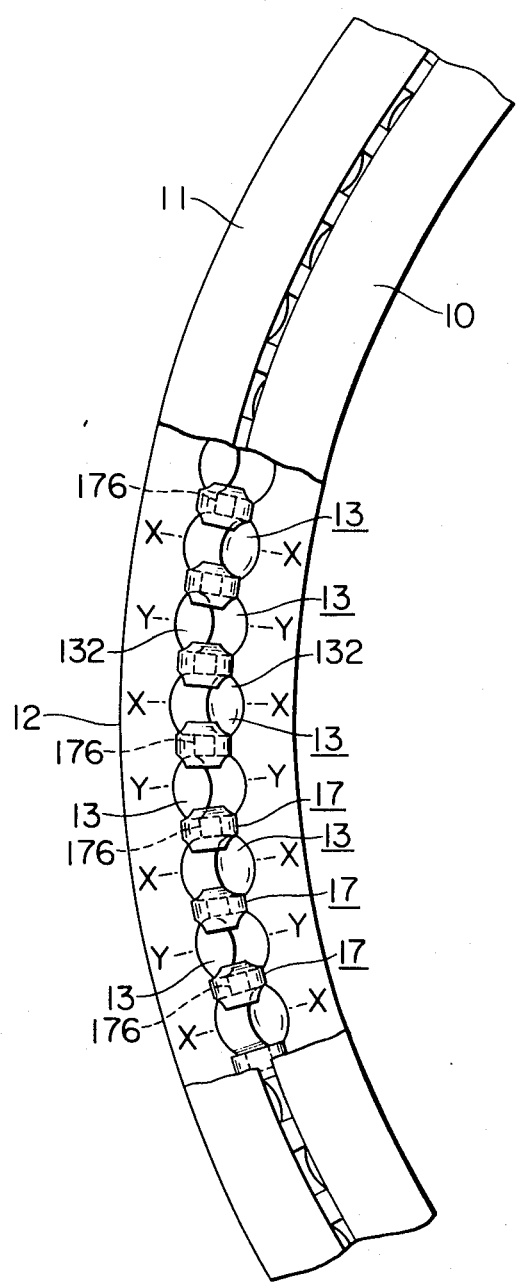
FIG. 3 is a partly cut-away plan view of the cross roller bearing of the present invention, partly omitted.
Figure 4:
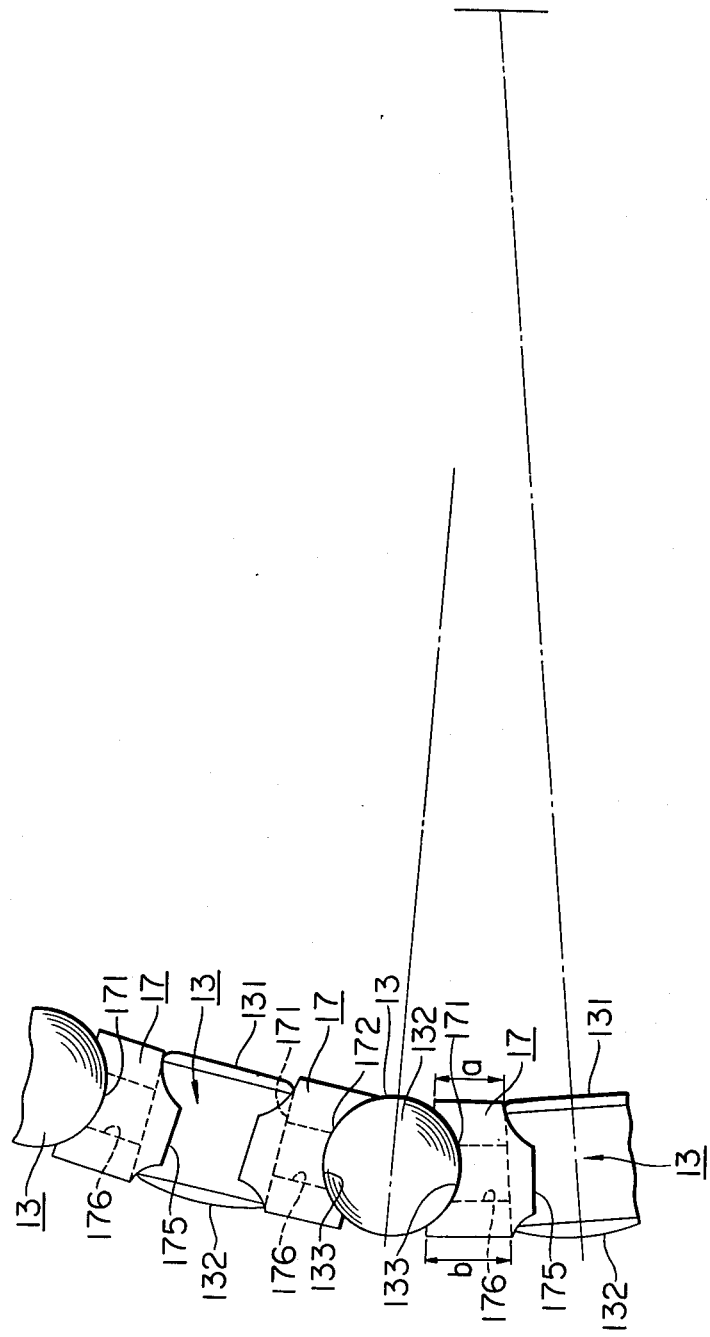
FIG. 4 is an enlarged plan view showing a state of contact between rollers and spacer retainers in the cross roller bearing of the present invention.
Figure 5:
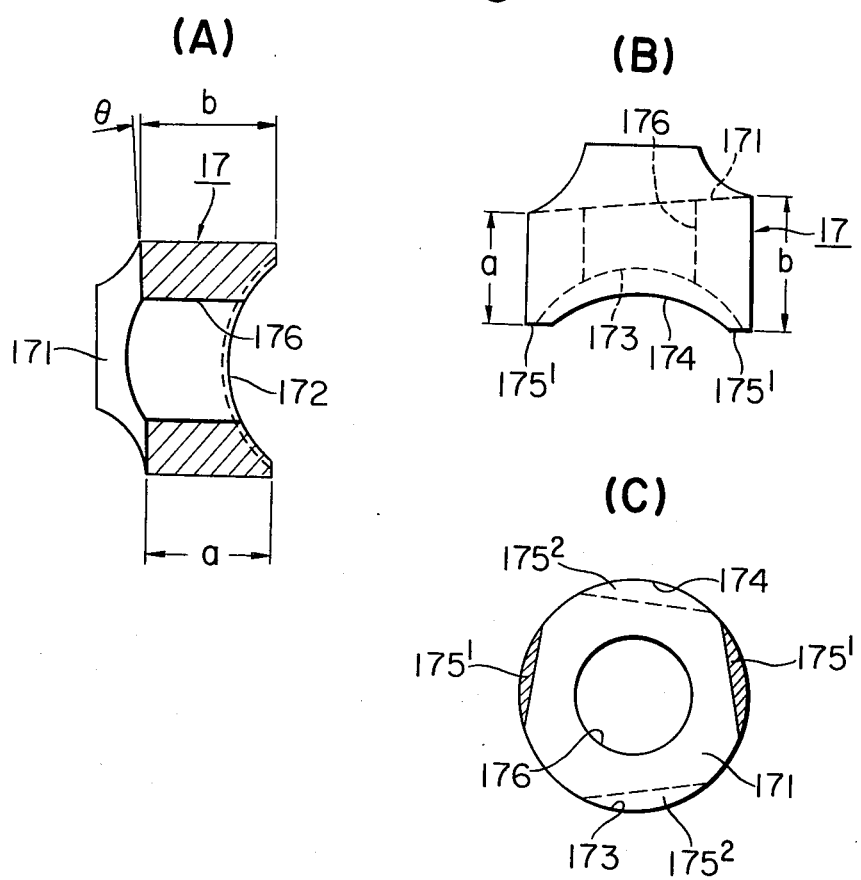
FIG. 5(A) is a longitudinally sectional front view of the spacer retainer as a principal part of the cross roller bearing of the present invention, (B) is a plan view thereof and (C) is a side view thereof.

Thus, one outer peripheral surface portion 133 of each roller 13 is held by the angular, curved concave surface of one spacer retainer 17, and the other outer peripheral surface portion 133 thereof is held by the angular, curved concave surface 172 of the other spacer retainer 17 (see FIGS. 3 and 4).

As shown in FIG. 2, moreover, the rollers 13 disposed between inner and outer races are arranged in such a manner that in a position adjacent to a roller which has an axis in X—X direction there is disposed a roller 13 which has an axis in Y—Y direction through the spacer retainer 17.

Consequently, when a roller 13 having an axis in Y—Y direction and a track surface on X—X side undergoes a central thrust load in one direction, application of a thrust load in the opposite direction causes a roller 13 having an axis in X—X direction and a track surface on Y—Y side to be loaded, so that the rated load is reduced to half, and at the same time a lubricant is fed from the oil reservoir through hole 176 onto the outer peripheral surface of the roller 13, thereby attaining a superior heat dissipation effect.

Thus, since each roller 13 is held at the aforementioned two outer peripheral surface portions thereof by the spacer retainers formed with curved concave surfaces having a predetermined angle $\theta$, it rotates always about the same central point 0 through the spacer retainers (see FIG. 4). Consequently, the differential slip of each roller is uniformalized, the rollers can be maintained at a stable motion and completely prevented from skewing.

Furthermore, since the last spacer retainer to be mounted in assembling the bearing is adjusted in its dimension, it is possible to minimize a radial gap.

Additionally, since the spacer retainers disposed among a large number of rollers are each formed with an oil reservoir through hole, a lubricant such as grease is fed during rotation to decrease frictional resistance. Particularly, the heat dissipation effect against the generated heat from the rollers is very superior.

Moreover, even if there occurs a slight change in the pitch circle diameter (P.C.D.), an abnormal friction between the spacer retainer and the roller can be avoided because the position of contact between a plane end portion of the spacer retainer and the outer peripheral surface of the roller is changed.

Since the spacer retainer only functions to guide and hold the roller, it may be formed by cutting of a nonferrous metal, e.g. a die casting alloy or a light alloy, not to mention a ferrous metal, or by injection molding of an engineering plastic material.

Although in the above embodiment of the present invention the spacer retainer is formed of a cylindrical body equal in diameter to and smaller in length than the roller, it is not limited thereto. Its outer peripheral surface portion not in contact with the roller may be formed not cylindrically but, for example, polygonally, which shape will not cause any difference in function and effect.

What is claimed is:

1. A cross roller bearing comprising an inner race having a V-shaped groove with an angle of approximately 90 degrees formed in the outer periphery thereof, a bisplit outer race having a V-shaped groove with an angle of approximately 90 degrees formed in the inner periphery thereof, and rollers disposed circumferentially in said V-shaped grooves in an alternately crossing manner through spacer retainers, said spacer retainers being each provided at both side ends thereof with curved surfaces perpendicularly intersecting each other, said curved surfaces being each formed as a curved concave surface having a radius of curvature somewhat larger than that of said roller, with a larger side thickness of a starting edge circle of said curved concave surface being smaller than a smaller side thickness of a terminating edge circle of said curved concave surface, said spacer retainer further having an axially extending oil reservoir through hole formed therein.

2. A cross roller bearing according to claim 1, wherein said spacer retainers are formed of a metallic material selected from ferrous and nonferrous metals.

* * * * *